United States Patent
Slack

(10) Patent No.: US 10,626,673 B2
(45) Date of Patent: Apr. 21, 2020

(54) TORQUE TRANSFER CONTROL TOOL

(71) Applicant: NOETIC TECHNOLOGIES INC., Edmonton (CA)

(72) Inventor: Maurice William Slack, Edmonton (CA)

(73) Assignee: NOETIC TECHNOLOGIES INC., Edmonton (CA)

( * ) Notice: Subject to any disclaimer, the term of this patent is extended or adjusted under 35 U.S.C. 154(b) by 0 days.

(21) Appl. No.: 15/778,589

(22) PCT Filed: Nov. 2, 2017

(86) PCT No.: PCT/CA2017/000240
§ 371 (c)(1),
(2) Date: May 23, 2018

(87) PCT Pub. No.: WO2018/085917
PCT Pub. Date: May 17, 2018

(65) Prior Publication Data
US 2018/0340372 A1    Nov. 29, 2018

Related U.S. Application Data

(60) Provisional application No. 62/421,963, filed on Nov. 14, 2016.

(51) Int. Cl.
*E21B 3/02*    (2006.01)
*E21B 19/16*   (2006.01)
(Continued)

(52) U.S. Cl.
CPC ............. *E21B 3/02* (2013.01); *E21B 17/02* (2013.01); *E21B 19/166* (2013.01); *F16D 7/00* (2013.01)

(58) Field of Classification Search
CPC .......... E21B 3/02; E21B 17/02; E21B 19/166; F16D 7/00
(Continued)

(56) References Cited

U.S. PATENT DOCUMENTS

| 3,608,334 A | 9/1971 | Zinner |
| 3,664,474 A | 5/1972 | Blake et al. |

(Continued)

FOREIGN PATENT DOCUMENTS

| DE | 3600196 A1 | 5/1986 |
| DE | 3600196 C2 | 4/1999 |
| WO | 2018085917 A1 | 5/2018 |

OTHER PUBLICATIONS

International Search Report re PCT/CA2017/000240, issued by the ISA/CA dated Feb. 14, 2018.
(Continued)

*Primary Examiner* — Greg Binda

(57) ABSTRACT

A torque transfer control tool has a rotary-stroking piston that is axially movable within a fluid chamber in response to rotation of mandrel having an upper end co-rotatably coupled to a first torsional drive system component and a lower end coaxially disposed and rotatable within the bore of a cylindrical housing. A lower end of the housing is co-rotatably coupled to a second torsional drive system component. Mandrel rotation in a first rotational direction moves the piston downward to pressurize a fluid in a lower fluid chamber below the piston. Fluid flow control means associated with the piston allows fluid flow out of the lower fluid chamber to prevent the fluid pressure therein from exceeding a first pre-set pressure, thus limiting the magnitude of the torque transferred to the second torsional drive system component in the first rotational direction via the tool housing.

24 Claims, 12 Drawing Sheets

(51) Int. Cl.
*E21B 17/02* (2006.01)
*F16D 7/00* (2006.01)

(58) Field of Classification Search
USPC .......................................... 464/26
See application file for complete search history.

(56) References Cited

U.S. PATENT DOCUMENTS

| | | | | |
|---|---|---|---|---|
| 3,998,443 | A * | 12/1976 | Webb | E21B 17/073 |
| | | | | 464/26 X |
| 4,204,413 | A | 5/1980 | Miller | |
| 4,266,644 | A | 5/1981 | Linsay | |
| 5,404,944 | A | 4/1995 | Lynde et al. | |
| 8,684,851 | B2 * | 4/2014 | Slack | E21B 19/16 |
| 9,291,006 | B2 * | 3/2016 | Bassinger | E21B 17/02 |

OTHER PUBLICATIONS

Written Opinion of the International Searching Authority re PCT/CA2017/000240, issued by the ISA/CA dated Feb. 14, 2018.

* cited by examiner

TORQUE TRANSFER CONTROL TOOL

FIELD

The present disclosure relates in general to apparatus for controlling or regulating the torque transfer between components of a torsional drive system, such as but not limited to drill string components used to transmit rotary power and carry axial loads in top-drive-equipped drill rigs, such as in casing-running or drilling-with-casing operations for wells bored into subsurface formations.

BACKGROUND

It is well known to construct a well by rotating a drill bit mounted to the lower end of string of drill pipe to drill a borehole into subsurface soil formations, and then to install a tubular casing (or liner) string in the borehole to prevent adjacent soil materials from falling into the borehole. After the borehole has been cased, a string of production tubing is run into the well to carry well fluids to the surface.

In cases where a top-drive-equipped drilling rig is used for the drilling operation (as opposed to a "rotary table"), it is increasingly common to install (or "run") the casing using so-called casing running tools (CRTs) operatively engaged by the top drive. In an alternative method of constructing a well commonly called "drilling with casing", the drill bit is mounted to the end of a casing string such that the casing string acts as the drill string and remains in the borehole after completion of drilling operations, thus eliminating the need to remove the drill string to install casing. In either of these methods, the top drive must transmit torque and axial loads to the tubular string (i.e., drill string or casing string), and a sealed conduit for drilling and completion fluids must be provided between the top drive and the tubular string.

Among the routine procedures carried out during well drilling and completion operations are the assembly (or "make-up") of the tubular string by means of threaded connections between adjacent lengths (or "joints") of pipe, and the disassembly (or "break-out") of these connections. The upper end of each joint of pipe in the tubular string typically carries a female thread (and is referred to as a "box end"), and the lower end of each joint carries a complementary male thread (and is referred to as a "pin end"). To add a new joint to the tubular string, the upper end of the string is suspended by gripping apparatus commonly known as "slips" mounted in the rig floor, and the pin end of the new joint is "stabbed" into the box end at the top of the string suspended in the slips. The new joint is then rotated to make up a threaded connection with the suspended string.

Such threaded connections usually need to be made up to a controlled torque to form a mechanical, metal-to-metal seal between the ends of the pipe joints, and to ensure that drilling loads (or casing running loads) can be properly transmitted through the connection. In more traditional drilling operations using a rotary table, tubing joints are typically made up using power tongs to both apply and control the rotation and torque. However, in drilling operations using top-drive-equipped rigs, the top drive may be used not only to assemble drill strings, but also for make-up (and break-out) of tubing string connections.

For threaded connections for casing strings and production strings, the applied make-up torque typically needs to be within a relatively more tightly-controlled range than for drill strings, to ensure proper function of the connection. These connections may incorporate torque shoulders and metal-to-metal seals requiring precise make-up control (commonly referred to as "torque-turns" control), and they tend to be more sensitive to over-torque damage than drill pipe connections. These connections are relied upon to provide a high level of leakage integrity. If the make-up torque of a connection is too low, the torque shoulders and metal-to-metal seals might not be properly engaged, resulting in poor connection performance. If the make-up torque is too high, the connection may be damaged, thereby compromising its seal performance and/or structural capacity.

Generally speaking, the torque-turns (i.e., rotational position) control systems of top drives only anticipate the control needs for make-up of tool joint connections used on drill pipe, and not the needs for relatively much more rapid response and more precise torque-turns control for casing and production tubing connection make-up. Furthermore, the large size of many top drive units makes such rapid and precise control difficult in any case. Accordingly, there is an increased need for means for better managing the torque loads applied during make-up operations using top drives, particularly in the context of casing and production tubing strings.

BRIEF SUMMARY OF THE DISCLOSURE

In general terms, in one aspect, the present disclosure teaches a torque transfer control tool for installation between components of a torsional drive system, for preventing the transfer of excessive torque that could damage the torsional drive system. This functionality is provided by means of a rotary-stroking piston or plunger actuated by a mandrel having an upper end which may be co-rotatably coupled to a first torsional drive system component (such as but not limited to a top drive), and a lower end coaxially disposed within the bore of a generally cylindrical tool housing, with a lower end of the tool housing being co-rotatably coupled to a second torsional drive system component (such as but not limited to a tubular casing joint).

The mandrel is coaxially rotatable relative to the tool housing, and it coaxially engages the rotary-stroking piston such that rotation of the mandrel will result in axial movement of the piston within the housing without corresponding axial movement of the mandrel relative to the housing. The piston is axially movable within a sealed primary fluid chamber that comprises an upper primary fluid chamber above the piston and a lower primary fluid chamber below the piston.

Downward axial movement of the piston (induced by rotation of the mandrel in a first rotational direction due to torque transferred to the mandrel by the first torsional drive system component) will pressurize a fluid present in the lower fluid chamber until the pressure therein reaches a first pre-set pressure, whereupon fluid flow control means associated with the piston will allow fluid from the lower fluid chamber to flow into the upper fluid chamber, so as to prevent the pressure in the lower fluid chamber from exceeding the first pre-set pressure. This has the effect of limiting the torque that will be transferred to the second torsional drive system component in the first rotational direction via the tool housing.

Similarly, upward axial movement of the piston (induced by rotation of the mandrel in a second rotational direction due to torque transferred to the mandrel by the first torsional drive system component) will pressurize a fluid present in the upper fluid chamber until the pressure therein reaches a second pre-set pressure, whereupon fluid flow control means associated with the piston will allow fluid from the upper fluid chamber to flow into the lower fluid chamber, so as to prevent the pressure in the upper fluid chamber from exceeding the second pre-set pressure. This has the effect of limiting the torque that will be transferred to the second torsional drive system component in the second rotational direction via the tool housing.

One non-limiting example of a practical use for a torque transfer control tool in accordance with the present disclosure is to facilitate more precise control of make-up torque during the assembly of tubing strings during the drilling and construction of oil and gas wells. In this particular context, such a tool may alternatively be referred to as a "torque hold sub" or "THS" (the term "sub" being a common term in the petroleum industry for a secondary component in a tubular string), as the tool is effective to "hold" the torque transferred thereby at a predetermined maximum level.

In one exemplary embodiment, the present disclosure teaches a tool for controlling torque transfer in a torsional drive system, comprising:

a generally cylindrical mandrel having an upper end and a lower end, wherein the upper end of the mandrel is adapted for coaxial connection to a first torsional drive system component;

a generally cylindrical housing having an upper end and a lower end, and defining a housing bore extending from the upper end at least partially through the housing, wherein the lower end of the mandrel extends coaxially into the housing bore such that that mandrel is rotatable relative to the housing; wherein the lower end of the housing is adapted for coaxial connection to a second torsional drive system component; and wherein the tool defines a fluid chamber in the region of the housing bore not occupied by the mandrel;

a primary piston sealingly movable axially within the fluid chamber, such that the primary piston divides the fluid chamber into an upper fluid chamber above the primary piston and a lower fluid chamber below the primary piston, with the respective volumes of the upper and lower fluid chambers varying with the axial position of the primary piston;

wherein:

at least one of the fluid chambers is arranged to provide pressured fluid containment;

fluid communication means for enabling fluid communication out of the at least one fluid chamber at a selected pressure;

piston actuation means whereby rotation of the mandrel in a first direction will cause downward movement of the primary piston within the fluid chamber, and whereby rotation of the mandrel in a second direction will cause upward movement of the primary piston within the fluid chamber;

downward movement of the primary piston will tend to expel fluid present in the lower fluid chamber; and upward movement of the primary piston will tend to expel fluid present in the upper fluid chamber.

In another exemplary embodiment, the present disclosure teaches a tool for controlling torque transfer in a torsional drive system, comprising:

a generally cylindrical mandrel having an upper end and a lower end, wherein the upper end of the mandrel is adapted for coaxial connection to a first torsional drive system component;

a generally cylindrical housing having an upper end and a lower end, and defining a tool housing bore extending from the upper end at least partially through the housing, wherein:

the lower end of the mandrel extends coaxially into the tool housing bore such that that mandrel is rotatable relative to the housing with a cylindrical outer surface of the mandrel sealingly engaging an upper seal region of the tool housing bore;

the lower end of the housing is adapted for coaxial connection to a second torsional drive system component; and the tool defines a fluid chamber below the upper seal region of the tool housing bore;

a primary piston sealingly movable axially within the fluid chamber, such that the primary piston divides the fluid chamber into an upper fluid chamber above the primary piston and a lower fluid chamber below the primary piston, with the respective volumes of the upper and lower fluid chambers varying with the axial position of the primary piston;

fluid communication means, for enabling fluid communication between the upper and lower fluid chambers, the fluid communication means including:

means for preventing fluid flow from the lower fluid chamber into the upper fluid chamber when the fluid pressure in the lower fluid chamber is below a first pre-set fluid pressure;

means for preventing fluid flow from the upper fluid chamber into the lower fluid chamber when the fluid pressure in the upper fluid chamber is below a second pre-set fluid pressure; and means for selectively controlling the rate of fluid flow between the upper and lower fluid chambers; and piston actuation means whereby rotation of the mandrel in a first direction will cause downward movement of the primary piston within the fluid chamber, and whereby rotation of the mandrel in a second direction will cause upward movement of the primary piston within the fluid chamber;

wherein:

downward movement of the primary piston will pressurize a fluid present in the lower fluid chamber until the fluid pressure therein reaches the first pre-set fluid pressure, whereupon the fluid communication means will enable fluid flow from the lower fluid chamber into the upper fluid chamber; and upward movement of the primary piston will pressurize a fluid present in the upper fluid chamber until the fluid pressure therein reaches the second pre-set fluid pressure, whereupon the fluid communication means will enable fluid flow from the upper fluid chamber into the lower fluid chamber.

Embodiments in accordance with the present disclosure may use what are commonly known as rotary actuators, meaning mechanisms that convert linear piston motion into piston shaft rotation using pressurized hydraulic fluid to move an actuator, thus creating torque in the system. Non-limiting examples of rotary actuators include helical-splined actuators, piston-and-helix actuators (which may alternatively be referred to as rotary-stroking pistons), and sliding sleeve actuators. In systems taught herein, however, instead of hydraulic fluid being used to move an actuator to create torque (as in conventional usage of rotary actuators), rotational input causes a piston or plunger to move the hydraulic fluid. In other words, rotary actuators as used in accordance with the present disclosure operate in reverse as compared to how they operate in conventional use.

BRIEF DESCRIPTION OF THE DRAWINGS

Embodiments will now be described with reference to the accompanying figures, in which numerical references denote like parts, and in which.

DETAILED DESCRIPTION

Figure 1:
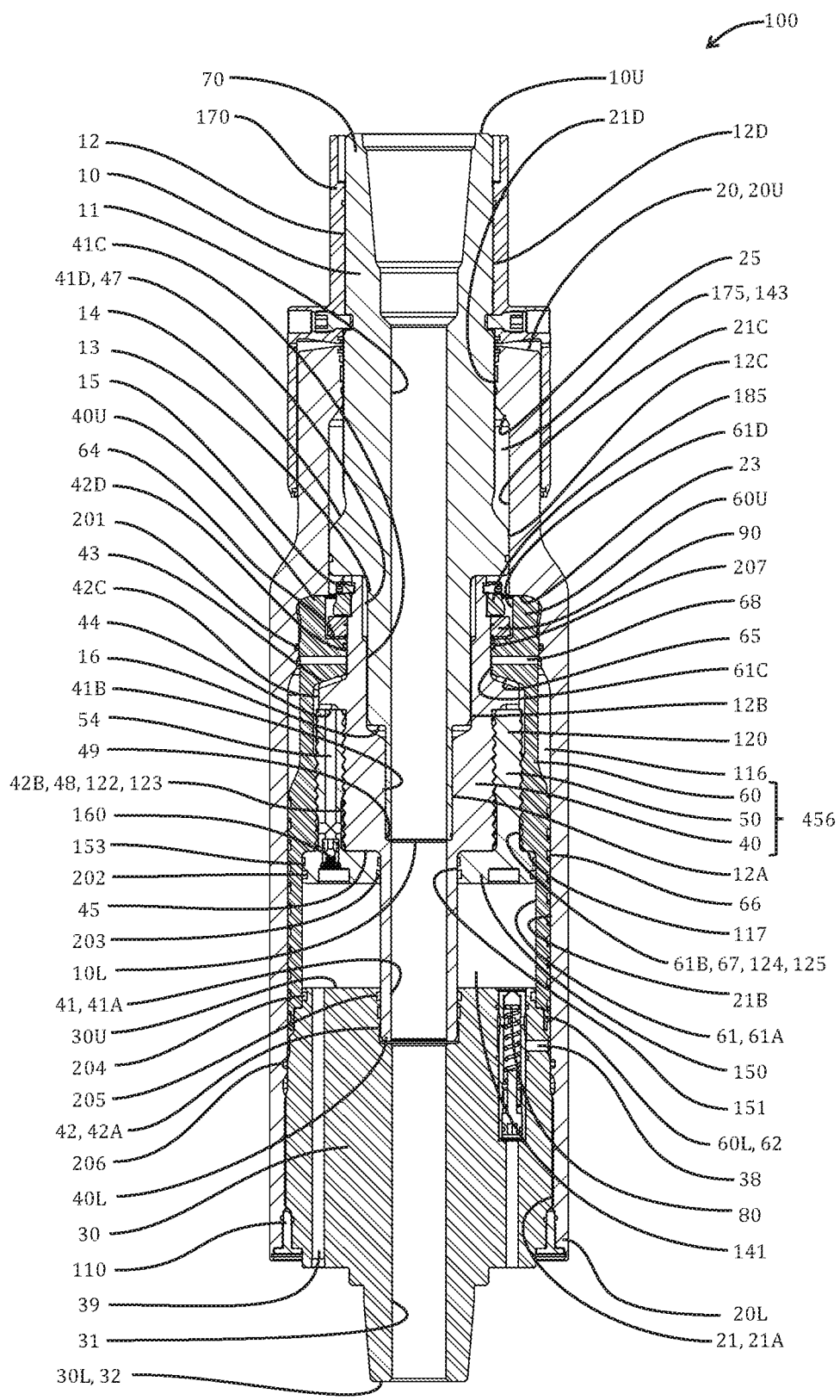
FIG. 1 is a cross-section through a first embodiment of a torque transfer control tool in accordance with the present disclosure, incorporating axial compensation capability, and shown with the primary piston in a fully-retracted (uppermost) position.

FIGS. 1-8 illustrate a first exemplary embodiment 100 of a torque hold sub tool (THS) in accordance with the present disclosure, comprising a generally cylindrical tool housing 20, an endcap 30, a generally cylindrical piston housing 60, and a rotary-stroking actuator 50 (which may alternatively be referred to as a helical actuator or a helical plunger), and a generally cylindrical mandrel assembly 70.

Tool housing 20 has an upper end 20U, a lower end 20L, and a tool housing bore 21 extending between upper and lower ends 20U and 20L. In the particular embodiment illustrated in FIG. 1, tool housing bore 21 defines:

a threaded lower tool housing bore interval 21A;
an unthreaded lower medial tool housing bore interval 21B above lower tool housing bore interval 21A and having a diameter nominally the same as lower tool housing bore interval 21A;
an unthreaded upper medial housing bore interval 21C above lower medial tool housing bore interval 21B and having a diameter less than the diameter of lower medial tool housing bore interval 21B;
an unthreaded upper tool housing bore interval 21D proximal to upper end 20U of tool housing 20;
a downward-facing annular shoulder 23 between tool housing bore intervals 21B and 21C; and
a downward-facing annular shoulder 25 between tool housing bore intervals 21C and 21D.

Endcap 30 has an upper end 30U, a lower end 30L, and an endcap bore 31 extending between upper and lower ends 30U and 30L. Endcap 30 is coaxially fixed within a lower region of tool housing bore 21 (by means of longitudinal keyways 110 or any other functionally suitable means), with external threads on endcap 30 engaging threaded tool housing bore interval 21A, and sealed relative to tool housing 20 by suitable seal means (such as but not limited to an O-ring disposed in an annular groove in tool housing bore 21 as generally denoted by reference number 206). Lower end 30L of endcap 30 is adapted for coaxial connection to a tubing string (not shown). In the illustrated embodiment, lower end 30L of endcap 30 is configured as a pin end for this purpose; but this is by way of non-limiting example only; in alternative embodiments, lower end 30L could be configured as a box end or in any other functionally adequate fashion.

Piston housing 60 has an upper end 60U and a lower end 60L, and is coaxially fixed to tool housing 20 within lower medial tool housing bore interval 21B. To prevent rotation of piston housing 60 relative to tool housing 20, lower end 60L of piston housing 60 is shown in FIG. 1 as being longitudinally keyed into upper end 30U of endcap 30, as generally denoted by reference number 62. However, this is by way of non-limiting example only, and piston housing 60 could be non-rotatably fixed relative to tool housing 20 by any suitable means within the knowledge of persons skilled in the art, without departing from the scope of the present disclosure.

As illustrated in FIG. 1, piston housing 60 defines a piston housing bore 61 coaxial with tool housing bore 21, with piston housing bore 61 defining:

an unthreaded lower piston housing bore interval 61A;
a lower medial region 61B above lower piston housing bore interval 61A, having a smaller nominal diameter than lower piston housing bore interval 61A, and carrying helical threads 67;
an unthreaded upper medial interval 61C above lower medial piston housing bore interval 61B;
an unthreaded upper piston housing bore interval 61D proximal to upper end 60U of piston housing 60;
a downward-facing annular shoulder 65 between lower medial piston housing bore interval 61B and upper medial piston housing bore interval 61C; and
an upward-facing annular shoulder 64 between upper medial piston housing bore interval 61C and upper piston housing bore interval 61D.

In the illustrated embodiment, piston housing 60 is disposed within tool housing bore 21 such that upper end 60U of piston housing 60 abuts downward-facing annular shoulder 23 in tool housing bore 21.

In the particular embodiment illustrated in FIG. 1, mandrel assembly 70 comprises a generally cylindrical upper mandrel 10 and a generally cylindrical lower mandrel 40. Upper mandrel 10 has an upper end 10U, a lower end 10L, an upper mandrel bore 11 extending between upper and lower ends 10U and 10L, and a generally cylindrical outer surface 12. Lower mandrel 40 has an upper end 40U, a lower end 40L, a lower mandrel bore 41 extending between upper and lower ends 40U and 40L, and a generally cylindrical outer surface 42.

Figure 2:
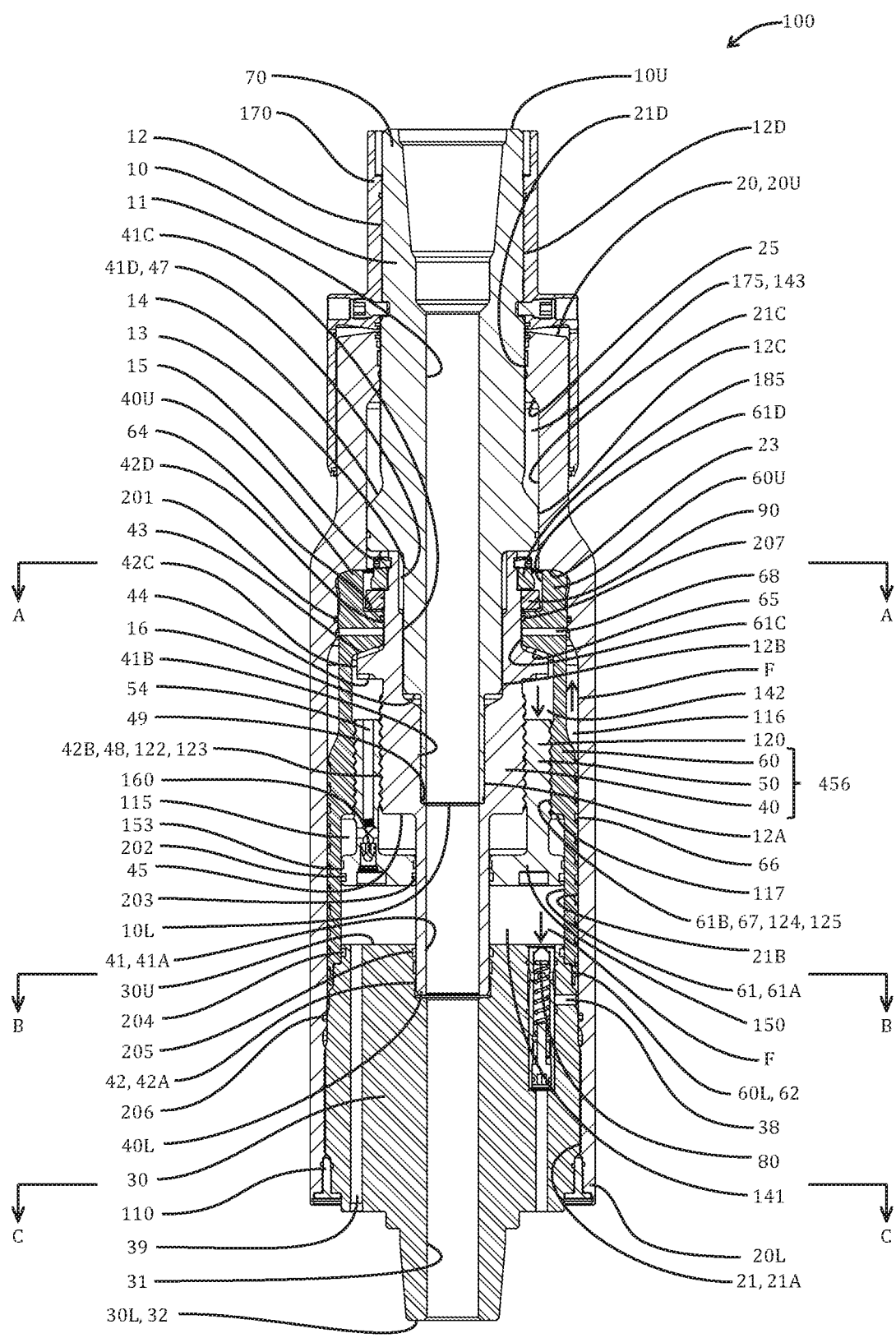
FIG. 2 is a cross-section through the tool in FIG. 1, showing the primary piston extended downward relative to the mandrel.
Figure 2A:
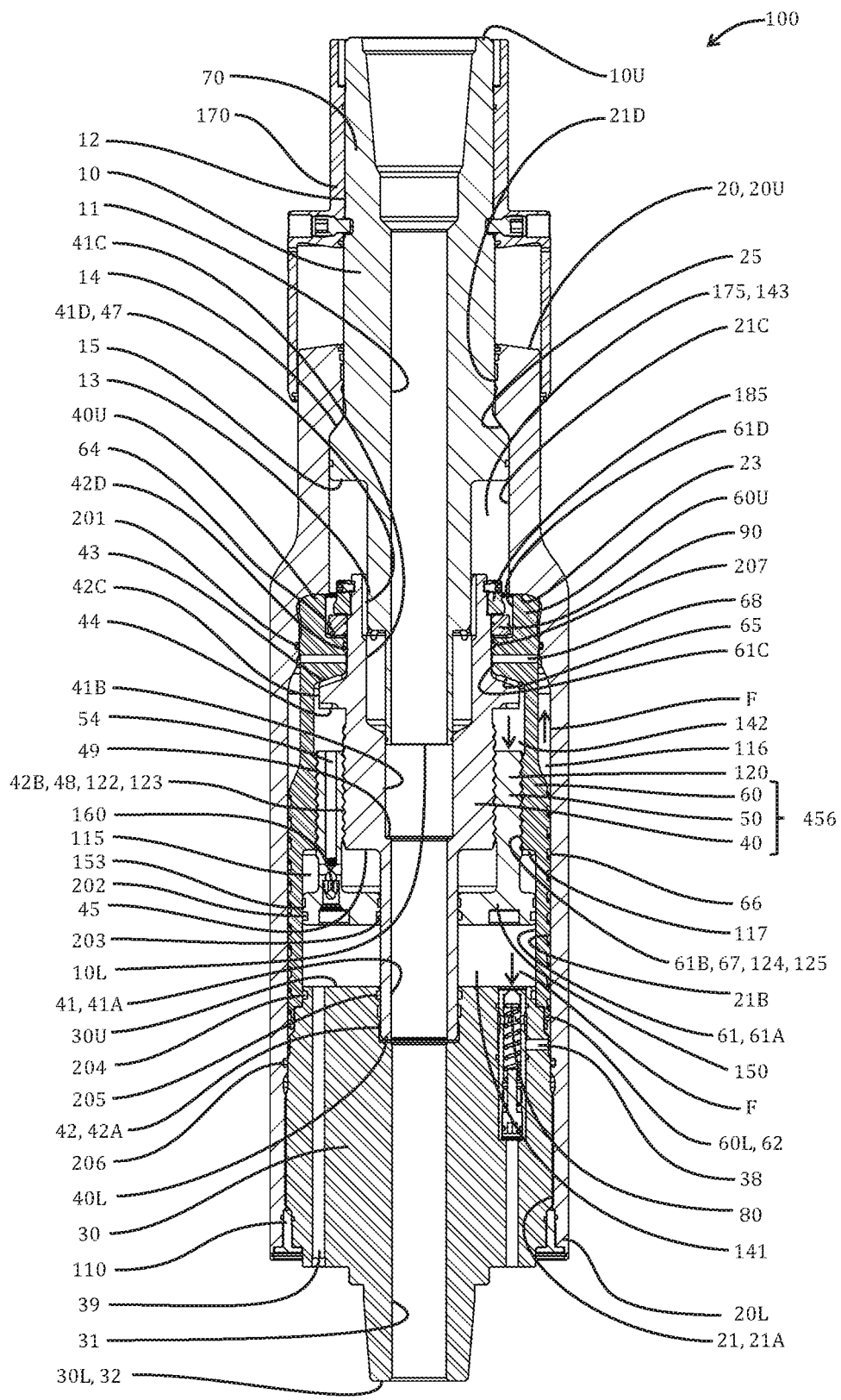
FIG. 2A is a cross-section through the tool in FIG. 1, showing the primary piston extended downward relative to the mandrel, and with the mandrel extended upward relative to the housing.
Figure 3:
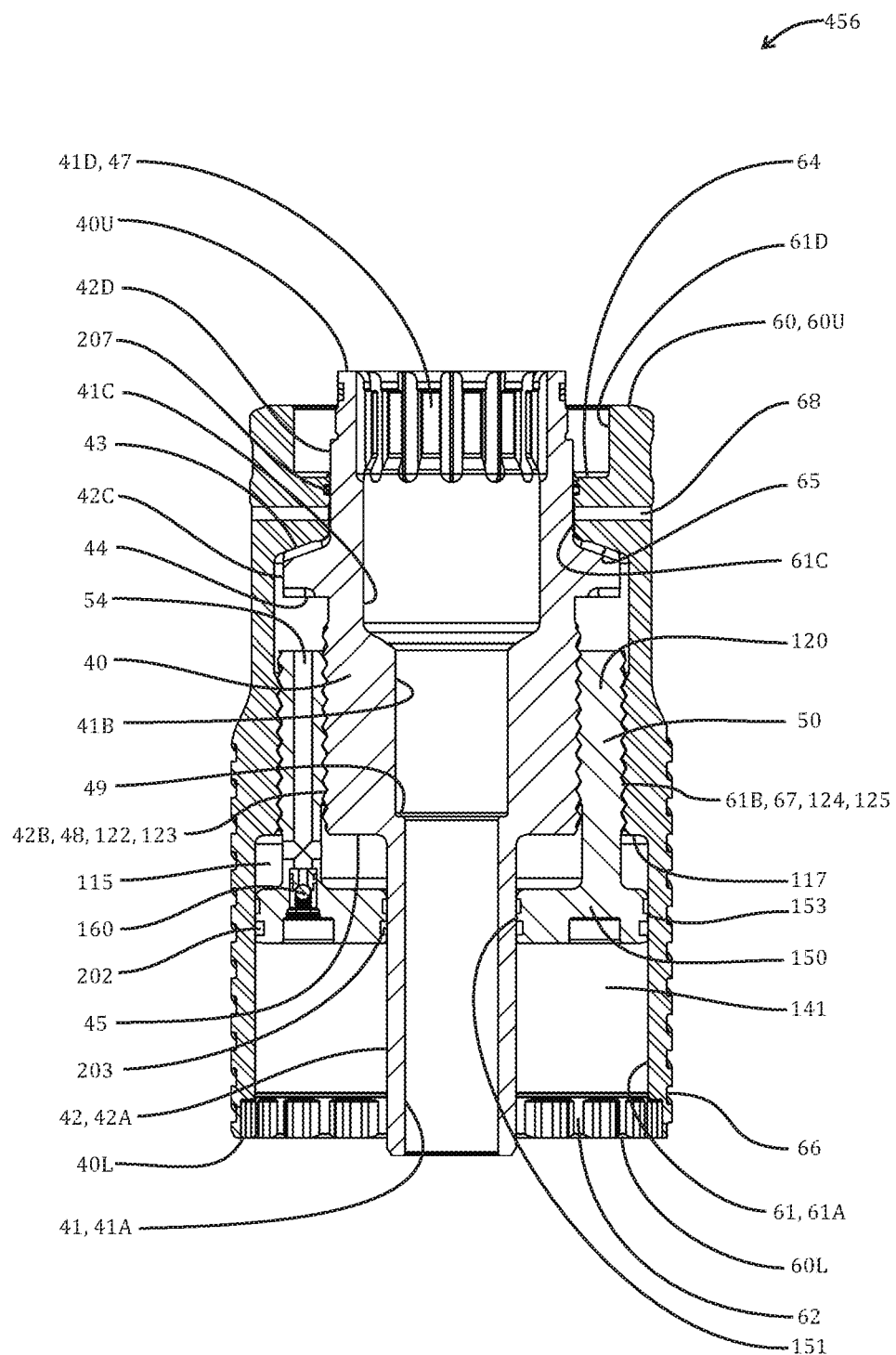
FIG. 3 is an enlarged cross-section through the mandrel/piston subassembly of FIG. 2, with the primary piston partially extended.

In the particular embodiment illustrated in FIGS. 1, 2, and 2A, outer surface 12 of upper mandrel 10 defines:
- an upper interval 12D;
- an upper medial interval 12C, having a larger diameter than upper interval 12D;
- a lower medial interval 12B, having a smaller diameter than upper medial interval 12C, and carrying longitudinal splines 13;
- a lower interval 12A, having a smaller diameter than lower medial interval 12B;
- an upward-facing annular shoulder 14 between upper interval 12D and upper medial interval 12C;
- a downward-facing annular shoulder 15 between upper medial interval 12C and lower medial interval 12B; and
- a downward-facing annular shoulder 16 between lower medial interval 12B and lower interval 12A;

lower mandrel bore 41 defines:
- an upper interval 41D carrying longitudinal splines 47;
- an upper medial interval 41C;
- a lower medial interval 41B;
- a lower interval 41A; and
- an upward-facing annular shoulder 49 between lower interval 41A and lower medial interval 41B;

and outer surface 42 of lower mandrel 40 defines:
- an upper interval 42D;
- an upper medial interval 42C, having a larger diameter than upper interval 42D;
- a lower medial interval 42B, having a smaller diameter than medial interval 42C, and carrying helical threads 48;
- a lower interval 42A, having a smaller diameter than medial interval 42B;
- an upward-facing annular shoulder 43 between upper interval 42D and upper medial interval 42C;
- a downward-facing annular shoulder 44 between upper medial interval 42C and lower medial interval 42B; and
- a downward-facing annular shoulder 45 between lower medial interval 42B and lower interval 42A.

As illustrated in FIGS. 1, 2, and 2A, upper interval 12D of outer surface 12 of upper mandrel 10 is slidingly and sealingly disposed within upper interval 21D of tool housing bore 21, and with upper medial interval 12C of upper mandrel 10 slidingly and sealing engaging upper medial interval 21C of tool housing bore 21, forming a sealed upper annular chamber 143 bounded by downward-facing shoulder 25 and upper medial interval 21C on tool housing 20, and upward-facing shoulder 14 and upper interval 12D on upper mandrel 10. The subassembly of lower mandrel 40, rotary actuator 50, and piston housing 60 may be referred to as torque-hold mechanism 456.

Also as illustrated in FIGS. 1, 2, and 2A, lower mandrel 40 coaxially engages upper mandrel 10 with splines 13 on lower medial outer surface interval 12B of upper mandrel 10 that matingly engage splines 47 on upper interval 41D of lower mandrel bore 41, such that upper mandrel 10 is axially movable relative to lower mandrel 40, but upper mandrel 10 and lower mandrel 40 are non-rotatable relative to each other. Accordingly, rotation of upper mandrel 10 about the longitudinal axis of THS 100 will cause corresponding rotation of lower mandrel 40, with upper mandrel bore 11 and lower mandrel bore 41 remaining in fluid communication, regardless of the relative axial positions of upper mandrel 10 and lower mandrel 40. Lower end 10L of upper mandrel 10 is disposed within lower mandrel bore 41 such that lower interval 12A of outer surface 12 of upper mandrel 10 is in axially-translatable engagement with lower medial interval 41B of lower mandrel bore 41.

In a typical procedure for assembling THS 100, upper mandrel 10 is first installed inside tool housing bored 21. Installation of lower mandrel 40 will take place after piston housing 60 has been installed inside tool housing bore 21, with upper end 60U of piston housing 60 abutting downward-facing shoulder 23 in tool housing bore 21. Lower mandrel 40 may then be inserted into tool housing bore 21 and piston housing bore 61, such that upward movement of lower mandrel 40 is prevented or restrained by downward-facing shoulder 65 in piston housing bore 61. As best seen in FIGS. 2 and 2A, an annular chamber 115 is thus formed between lower medial outer surface interval 42B of lower mandrel 40 and lower medial piston housing bore 61B. Actuator 50 is then installed (as described in greater detail below), followed by installation of endcap 30 into lower end 20L of tool housing bore 21.

In the illustrated embodiment, lower end 40L of lower mandrel 40 sealingly and coaxially engages endcap bore 31 such that mandrel assembly 70 is rotatable about the longitudinal axis of THS 100 relative to endcap 30 and tool housing 20, with endcap bore 31 in fluid communication with lower mandrel bore 41. As indicated in FIG. 2, sealing between lower mandrel 40 and endcap bore 31 may be provided, by way of non-limiting example, by a circumferential seal groove 205 formed in endcap bore 31, for receiving an O-ring seal element. However, any other functionally suitable seal means in accordance with known seal technologies may be used for this particular purpose (and for other similar sealing purposes in connection with embodiments disclosed and claimed herein) without departing from the scope of the present disclosure.

In the embodiment shown in FIGS. 1, 2, and 2A, rotary-stroking actuator 50 includes an annular primary piston 150 having a center bore 151 that is slidingly and sealingly engageable with lower interval 42A of outer surface 42 of lower mandrel 40, and a cylindrical outer surface 153 that is slidingly and sealingly engageable with lower piston housing bore interval 61A. Rotary actuator 50 also includes a cylindrical piston shaft 120 projecting upward from primary piston 150, with piston shaft 120 having a cylindrical piston shaft wall 121 which in turn has an inner cylindrical surface 122 and an outer cylindrical surface 124. Inner cylindrical surface 122 of piston shaft wall 121 carries helical threads 123 that are matingly engageable with helical threads 48 on lower medial interval 42B of outer surface 42 of lower mandrel 40, and outer cylindrical surface 124 of piston shaft wall 121 carries helical threads 125 that are matingly engageable with helical threads 67 on lower medial interval 61B of outer surface 61 of piston housing 60, such that piston shaft 120 can be rotated into annular chamber 115 formed between lower medial interval 61B of piston housing bore 61 and lower medial interval 42B of outer surface 42 of lower mandrel 40.

As may be seen in FIGS. 1, 2, and 2A, upward movement of actuator 50 within annular chamber 115 is restricted by downward-facing shoulder 45 on lower mandrel 40, and/or by a downward-facing shoulder 117 formed between lower piston housing bore interval 61A and lower medial piston housing bore interval 61B. Although downward-facing shoulder 117 is illustrated in FIGS. 1, 2, and 2A, persons skilled in the art will recognize that it is optional and not essential.

In an alternative embodiment, outer cylindrical surface 124 of piston shaft 120 and lower medial region 61B of piston housing bore 61 could have mating longitudinal splines instead of helical threads 125 and 67 as shown in FIGS. 1, 2, and 2A. In this embodiment, rotary actuator 50 would stroke axially without rotation.

In the particular embodiment illustrated in FIGS. 1, 2, and 2A, a valve 80 extends axially through endcap 30, and a valve 160 extends axially through primary piston 150 and piston shaft 120. Valves 80 and 160 may be set to open at pre-set pressures, which could be different from each other. Valves 80 and 160 provide a sealing response that changes depending on which side of the valve fluid pressure may be exerted. For adequate function of the tool, the valves require backflow prevention, pressure relief that is either selectable or adjustable and activated by a pressure differential across the valve, and port size to support the desired flow characteristics. As is known to those skilled in the art, there are many possible architectures for the valves to achieve these objectives. In the preferred embodiment, the valves comprise a valve seat and a sealing element.

When fluid pressure acts on the sealing element from the side opposite the valve seat, herein referred to as the outlet side, the pressure acts to sealingly engage the sealing element to the valve seat and prevent fluid flow. When fluid pressure acts on the sealing element from the same side as the valve seat, herein referred to as the inlet side, the pressure acts to disengage the sealing element from the valve seat, thus allowing fluids to flow through the valve.

The sealing element is sealingly pre-engaged to the valve seat by use of a pre-loaded spring, such that higher fluid pressure is required on the inlet side to disengage the sealing element from the valve seat. The differential fluid pressure required to disengage the sealing element from the valve seat is herein referred to as the opening pressure. The opening pressure is a function of the preload force exerted by the spring on the sealing element and then on the valve seat and the area of the sealing element upon which the fluid pressure acts. Pre-engagement is achieved. Valve 80 further comprises an adjustment to alter the amount of pre-engagement between the sealing element and the valve seat, such that the opening pressure can be adjusted.

As best seen in FIGS. 2 and 2A, primary piston 150 is axially movably disposed within a sealed primary fluid chamber 140 defined by a lower primary fluid chamber 141 and an upper primary fluid chamber 142. Lower primary fluid chamber 141 is defined by piston housing bore 61, outer surface 42 of lower mandrel 40, primary piston 150, and endcap 30. Accordingly, the volume of lower primary fluid chamber 141 will vary with the axial position of primary piston 150. Pressure integrity of lower primary fluid chamber 141 is maintained by seals placed at 202, 203, 205 and 204 and by valve 80, which is oriented such that pressure in lower primary fluid chamber 141 acts on the inlet side of valve 80, and by valve 160, which is oriented such that pressure in lower primary fluid chamber 141 acts on the outlet side of valve 160.

Upper primary fluid chamber 142 comprises an annular chamber 116 between tool housing 20 and piston housing 60, and an annular chamber 115 between piston housing 60 and lower mandrel 40 above primary piston 150, with annular chambers 115 and 116 being in fluid communication via a port 68 in piston housing 60. Accordingly, the volume of upper primary fluid chamber 142 will vary with the axial position of primary piston 150. Pressure integrity of upper primary fluid chamber 142 is maintained by seals 202, 206, 201, 207, and 204, and valve 160, which is oriented such that pressure in upper primary fluid chamber 142 acts on the inlet side of the valve 160, and by valve 80, which is oriented such that pressure in upper primary fluid chamber 142 acts on the outlet side of valve 80.

A port 39 is provided in endcap 30 for filling fluid chambers 141 and 142 with a suitable fluid (such as but not limited to a hydraulic fluid) or fluid mixture. After filling and during operation, a plug is placed in port 39 at its lower end to seal port 39 and prevent fluid leakage.

THS 100, in the embodiment shown in FIGS. 1, 2, and 2A, is configured such that when make-up rotation at the top drive is transferred to upper mandrel 10 and lower mandrel 40, primary piston 150 will tend to rotate, thus resulting in concurrent axial movement away from lower mandrel 40 and toward endcap 30. The relative rotation and axial translation of primary piston 150 relative to the lower mandrel and housing depends on the helix angles (thread lead) of the helically-threaded engagements between piston shaft 120 and piston housing 60 and between piston shaft 120 and lower mandrel 40. The helix angles may be selected to control, in combination with other geometry variables, the relationship between rotary and axial movement. Steeper helix angles will result in less relative rotation between respective parts and higher axial translation of primary piston 150 for a given increment in relative rotation, whereas lower helix angles will result in higher relative rotation between respective parts and lower axial translation of the primary piston for a given increment in relative rotation.

Downward axial translation of primary piston 150 results in compressive loads being generated in a fluid provided in lower fluid chamber 141, thus increasing the pressure of that fluid, and thereby restraining incremental axial translation of primary piston 150. Selection of helix angles is thus further directed to control piston displacement and resultant fluid displacement, thus significantly facilitating control or regulation of the rotation allowed and the fluid pressure induced by torque applied to THS 100.

The composition of the fluid (or fluid mixture) in lower fluid chamber 141 is selected to provide the desired tool stiffness, defined by the amount of pressure generated by the piston stroke compressing the fluid, for the application. While axial translation of the piston is restrained by the fluid, relative rotations between lower mandrel 40, primary piston 150 and piston housing 60 are prevented; accordingly, the torsional loads are transmitted from lower mandrel 40 through piston housing 60 to endcap 30. As torsional loads increase, the pressure of the fluid will increase due to the increased axial compression placed on the fluid by primary piston 150.

When the pressure in lower fluid chamber 141 exceeds the opening pressure of valve 80, fluid will be displaced from chamber 141 through relief valve 80 and port 38 to upper fluid chamber 142 thus allowing axial translation of primary piston 150 toward endcap 30. Accordingly, torsional load transmitted through piston housing 60 tends to plateau while relative rotation occurs between mandrel assembly 70 and endcap 30.

At the end of its stroke, primary piston 150 butts against endcap 30, at which point there can be a risk of frictional locking (analogous to jamming of a torqued nut into the head of a bolt) at the helically-threaded engagements between piston shaft 120 and piston housing 60 and between piston shaft 120 and lower mandrel 40. In the described tool configuration, for a given thread form, the helix angles may be selected to be sufficiently steep to prevent such frictional locking, as will be apparent to one skilled in the art. For reference, the fluid path through the tool is indicated by arrows F in FIG. 2.

Figure 9:
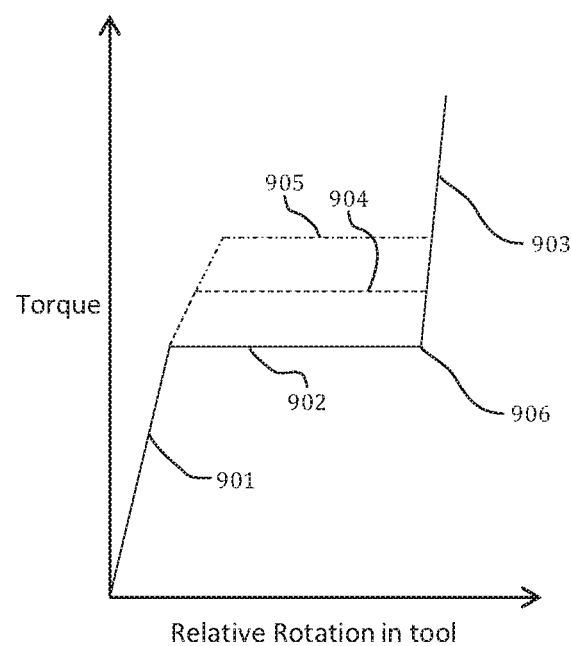
FIG. 9 is a graph of applied torque versus relative rotation between the mandrel and the tool housing, with reference to the embodiment illustrated in FIGS. 1-8.

Tools in accordance with the present disclosure provide means for generating a controlled torque/rotation profile (which may be referred to as a plateau, although the plateau does not necessarily have to be flat) that is transmitted through the tool when torque and rotation are applied to the tool. Referring now to FIG. 9, which shows the relationship of the torque transmitted through the tool as a function of the relative rotation within the tool, such as (by way of non-limiting example) the relative rotation between a top drive connected to the upper end of the tool and a casing running tool or pipe string connected to the lower end of the tool. The solid curve in FIG. 9 shows the response of the tool under low rotation speeds. Curve portion 901 shows the initial tool response which is a function of the tool stiffness and the compliance of the restraining fluids in lower fluid chamber 141 of the tool. Curve portion 902 shows the response after the tool is activated at a pre-set torque level. Curve portion 903 shows the tool response after the tool bottoms out and the torque transmitted becomes a function of tool component stiffness only. Curve portion 903 thus will necessarily be steeper than curve portion 901. Curve portions 904 and 905 demonstrate the torque response under increasing rotational speeds. Higher rotation speed will cause increased pressure drop as the velocity of fluids flowing within the tool during activation increases and dynamic effects generate frictional losses, thus increasing the fluid pressure in lower fluid chamber 141 and subsequently the level of torque at the plateau.

Figure 4:
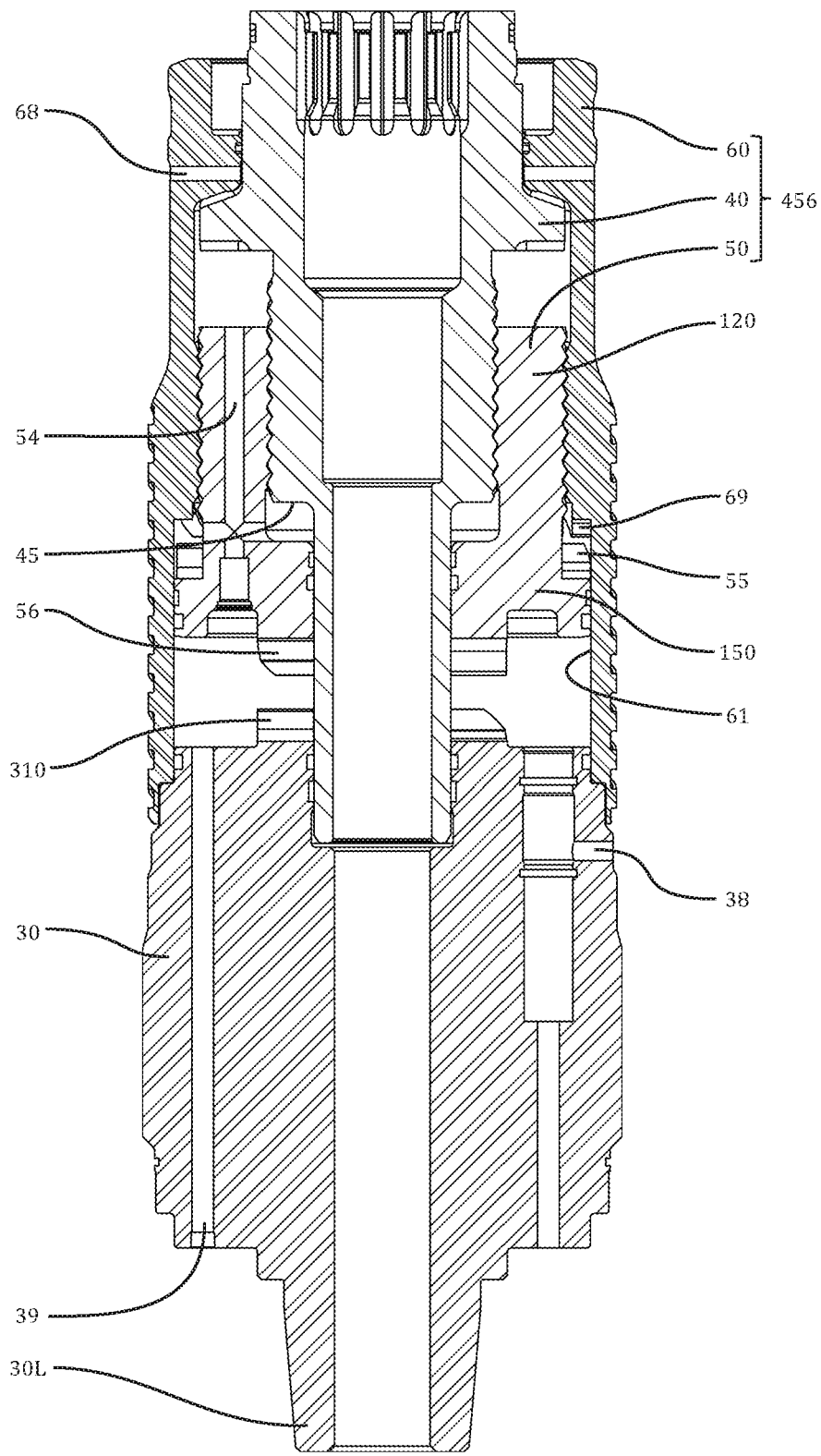
FIG. 4 is a longitudinal cross-section through an alternative embodiment of the mandrel/piston/endcap subassembly of FIG. 3, with dog stops provided on the primary piston and endcap to limit the primary piston's downward stroke.
Figure 5:
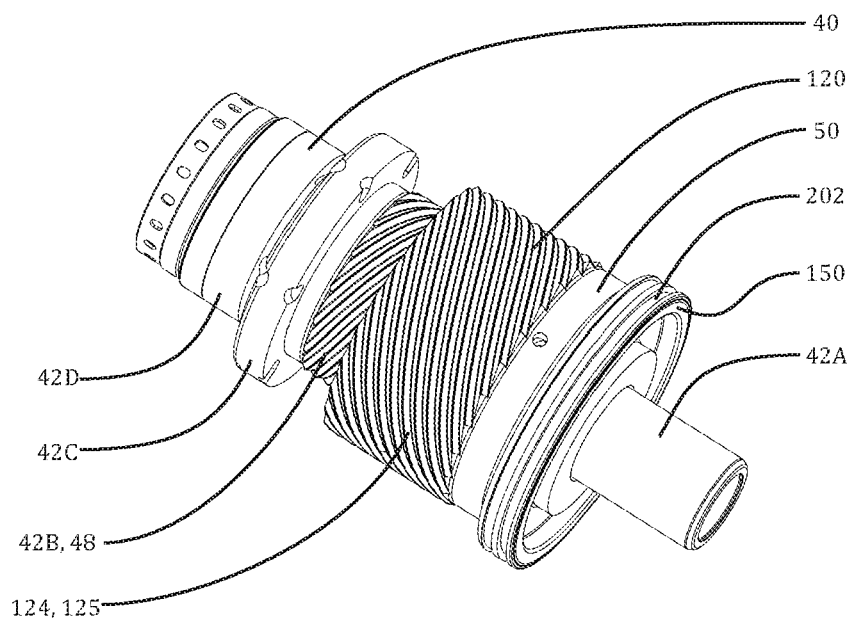
FIG. 5 is an oblique view of the mandrel/piston subassembly of FIG. 2, with the primary piston partially extended.
Figure 6:
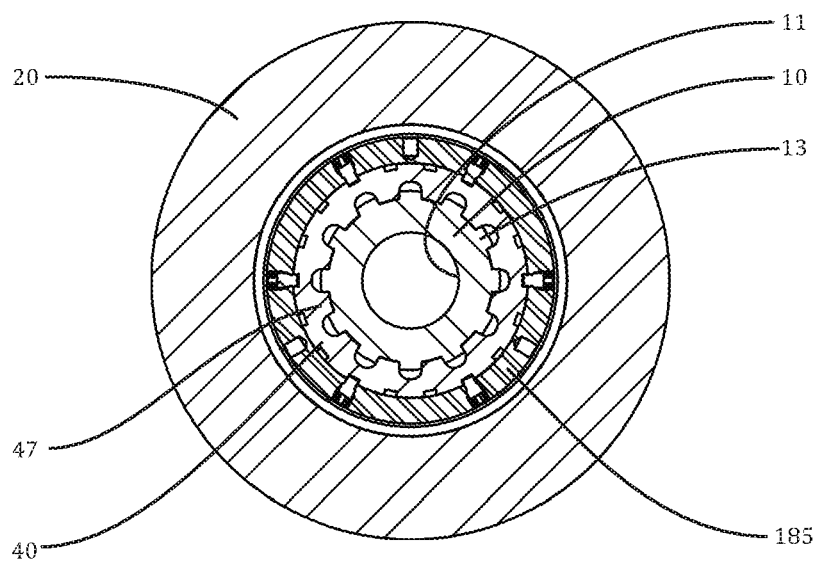
FIG. 6 is a transverse cross-section through the tool of FIG. 2 at plane A-A in FIG. 2.
Figure 7:
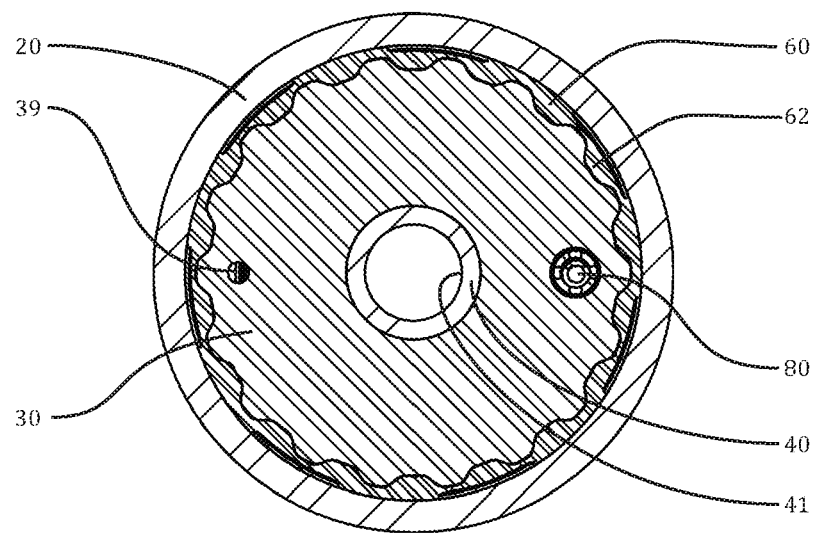
FIG. 7 is a transverse cross-section through the tool of FIG. 2 at plane B-B in FIG. 2.
Figure 8:
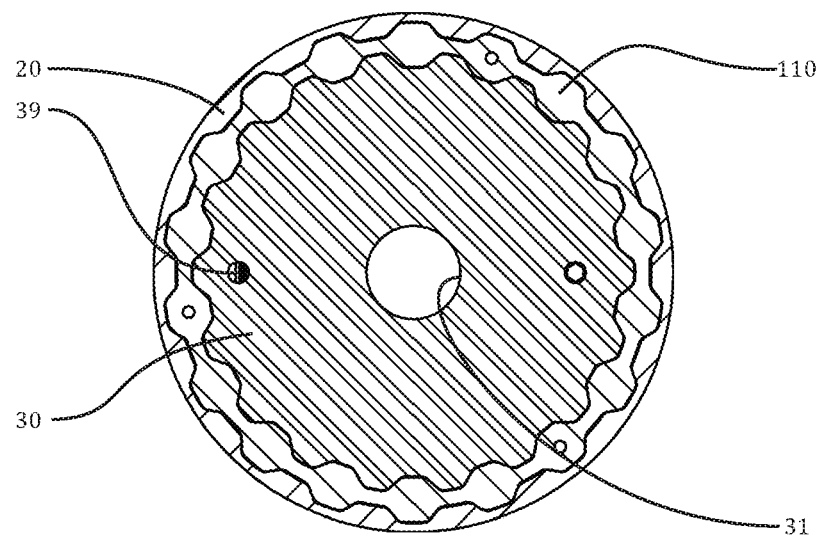
FIG. 8 is a transverse cross-section through the tool of FIG. 2 at plane C-C in FIG. 2.

FIG. 4 illustrates an alternative configuration of lower mandrel 40, rotary actuator 50, and piston housing 60 (forming torque-hold mechanism 456) in which frictional locking is prevented, thus eliminating the above-noted limitation with respect to helix angle selection. This configuration shows an alternative means of engagement between primary piston 150 with endcap 30 during make-up operations and similarly between primary piston 150 and piston housing 60 during break-out operations. In this configuration, primary piston 150 is provided with dog stops 56 projecting downward from primary piston 150, and dog stops 55 projecting upward from primary piston 150. In addition, dog stops 69 are provided on piston housing bore 61 so as to be engageable with dog stops 55 on primary piston 150, and dog stops 310 are provided on endcap 30 so as to be engageable with dog stops 56 on primary piston 150.

Accordingly, when primary piston 150 has helically translated a sufficient distance downward, dog stops 56 contact dog stops 310 on endcap 30, thus preventing further relative rotation so that incremental rotation applied to lower mandrel 40 (via upper mandrel 10) is passed directly to endcap 30. The dog stops thus provide positive means for stopping primary piston 150 when it contacts endcap 30 and prevents primary piston 150 from sticking due to frictional locking at the helically-threaded engagements between piston shaft 120 and piston housing 60 and between piston shaft 120 and lower mandrel 40.

Similarly in break-out, dog stops 69 provide a positive stop for dog stops 55, preventing primary piston 150 from sticking due to frictional locking. When primary piston 150 has helically translated a sufficient distance upward, dog stops 55 on primary piston 150 contact dog stops 69 on piston housing 60, thus contact preventing further relative rotation. The dog stops thus provide a positive stop for primary piston 150 before it can contact downward-facing shoulder 45 on lower mandrel 40. This prevents primary piston 150 from sticking due to frictional locking (as previously described).

Movement of pressurized fluid through valve 80 will generate heat and induce a subsequent rise in the fluid temperature. To ensure that heat does not adversely affect tool performance (such, for example, by increasing the fluid temperature beyond a physical limit, like the fluid's boiling or flash points, or degrading the quality of elastomeric seals or valve components), the heat must be dissipated from the fluid to the atmosphere. The fluids in fluid chambers 141 and 142 represent a small portion of the total thermal mass of the tool; therefore, the mechanical components of the tool can function as a heat sink. The contact area between the working fluid and mechanical components of the tool may be selected to enable heat to be dissipated at an adequate rate into the tool. External tool surface area may be selected to dissipate the heat to the atmosphere.

In the embodiment illustrated in FIGS. 1, 2, and 2A, heat dissipation is further facilitated by providing a grooved interval 66 on outer surface of piston housing 60. The geometry of the grooved interval 66 (illustrated by way of non-limiting example as a multi-start helical pattern) is therefore selected to encourage mixing and fluid dispersion around the circumference, and to balance the flow characteristics of this interval with the contact area between the fluid and tool.

THS 100 may be reset (i.e., returned to its original position) by applying break-out rotation to upper mandrel 10 (and thereby to lower mandrel 40) such that primary piston 150 helically translates upward toward downwards-facing shoulder 44 on lower mandrel 40. This reverse helical motion causes fluids to be displaced from upper fluid chamber 142 into lower fluid chamber 141 through valve 160 via a port 54 formed in piston shaft 120 above valve 160. Valve 160 optionally may be configured to provide pre-engagement of the valve sealing element such that during break-out rotation, translation of primary piston 150 axially toward lower mandrel 40 is restrained by fluid in upper fluid chamber 142 such that torsional loads are transmitted through piston housing 60. When sufficient pressure is generated such that the opening pressure of valve 160 is reached, fluid is displaced from upper fluid chamber 142 through port 54 back into lower fluid chamber 141, thus allowing upward axial translation of primary piston 150 towards lower mandrel 40 and relative rotation between the upper and lower ends of THS 100.

The opening pressure of relief valve 80, in combination with the fluid characteristics and flow path geometry from fluid chambers 141 to 142, defines the maximum torsional load that can be transferred through torque-hold mechanism 456 in make-up rotation before relative rotation begins and the torque transmitted plateaus (curve 902 in FIG. 9). The length of axial translation of primary piston 150, combined with the geometry of the helical threads on piston shaft 120, defines the maximum number of rotations before the tool bottoms out (point 906 in FIG. 9). The speed at which the relative rotation is applied in combination with the flow resistance of the fluid as it passes from lower fluid chamber 141 into upper fluid chamber 142 defines the incremental torque that can be achieved during the plateau (curves 904 or 905 in FIG. 9).

In one embodiment, the flow resistance between fluid chambers 141 and 142 is minimized, such that the actual differences in torque between curves 902, 904, and 905 are small, by incorporating a grooved interval 66 between piston housing 60 and tool housing 20 from the lower end 40L of piston housing 60 to the upper end 40U. Any means that reduces the flow resistance in the annular space could be used, such as, by way of non-limiting example, helical grooves in an inner surface of tool housing 20 or a series of axial grooves or axial ports in piston housing 60 or tool housing 20. Alternatively, flow resistance could be increased, by changing the shape and path of any port or grooved interval through which fluids must pass when flowing from fluid chamber 141 to fluid chamber 142, such that curves 904 or 905 occur at some other torque level, the torque level and the corresponding rotation rate being selected based on the particular application.

The opening pressures of valves 80 and 160 are illustrated as being mechanically controlled. In such embodiments, opening pressures would have to be set manually at the tool. However, other means could be used to set valve opening pressures indirectly or automatically. For example, mechanical setting of valve opening pressures could be effected by an electronic servo mechanism controlled by a transmitter located away from the tool. Communication between the servo mechanism and the transmitter could be achieved either through wired or wireless (remote) equipment, although wireless would be preferred in a typical application to avoid damage to the electronic equipment as the tool is rotated.

Further, the transmitter could be linked to a computer system with intelligent programming, such that the "hold" torque is set automatically based on a predefined program or a path tailored for the specific connections that are being made up or broken out.

The opening pressure of relief valve 160 therefore controls the maximum torsional load that can be transferred from mandrel 70 to tool housing 20 in break-out rotation before relative rotation begins. The length of axial translation (i.e., stroke) of primary piston 150 in make-up rotation, combined with the geometry of the helical threads on piston shaft 120, defines the maximum number of rotations through which the torsional load is held constant.

It is not essential that valve 80 or valve 160 (or an alternative control valve) be in the specific locations illustrated in the Figures to achieve the desired function. Persons skilled in the art will readily appreciate that other effective means of providing fluid flow communication and restriction between fluid chambers 141 and 142 may be devised without inventive effort. To provide non-limiting examples of this, a similar function could be achieved by removing port 54 and valve 160 and replacing relief valve 80 with a double-acting control valve or by removing port 54 and valve 160 and placing additional ports in endcap 30 and a control valve within those ports, such that the relief valve acts to prevent fluid movement from fluid chamber 141 into fluid chamber 142 and restrains fluid movement from chamber 142 into chamber 141.

Throughbores 11, 31 and 41 provide a flow path through THS 100 for circulating fluids into the wellbore during drilling and running operations. Seals 205 and 208 ensure no fluid communication between the internal working fluid and the wellbore fluids.

Optionally, a mandrel sleeve 170 may be provided over upper portions of upper mandrel 10 and tool housing 20. Sleeve 170 is non-rotatably and non-translatably fixed to upper mandrel 10 by any suitable means (such as bolts, splines, and/or keyways), but is both rotatable and axially movable relative to tool housing 20. Sleeve 170 provides a sacrificial surface for gripping upper mandrel 10 for make-up and break-out of threaded connections in a tubular string, and for preventing contaminants from entering tool housing 20.

The embodiment shown in FIGS. 1, 2, and 2A incorporates an axial compensation functionality, whereby upper mandrel 10 can translate axially relative to tool housing 20, within a certain axial compensation stroke length, without axial compression or tension being carried through THS 100. For a given embodiment of THS 100, the axial compensation stroke length is defined by the particular geometry and configuration of upper mandrel 10 and tool housing 20. More specifically, in the illustrated embodiment, when upper mandrel 10 is at the upper end of its axial compensation stroke (i.e., maximum extension out of tool housing 20), upward-facing shoulder 14 on upper mandrel 10 will abut downward-facing shoulder 25 on tool housing bore 21, as may be seen in FIG. 2A. When upper mandrel 10 is at the lower end of its axial compensation stroke (i.e., fully retracted into tool housing 20), downward-facing shoulder 15 on upper mandrel 10 will abut upper end 40U of lower mandrel 40, as may be seen in FIGS. 1 and 2.

As best seen in FIGS. 1 and 2, and as previously described herein, upper annular chamber 143 is formed between upper interval 12D of outer surface 12 of upper mandrel 10 and upper medial tool housing bore interval 21C when upper mandrel 10 is less than maximally extended out of lower mandrel 40. As best seen in FIG. 2A, a lower annular chamber 144 is formed between upper interval 12D of outer surface 12 of upper mandrel 10 and upper medial tool housing bore interval 21C when upper mandrel 10 is not fully retracted into lower mandrel 40. A pressure relief port (not shown) of any functionally suitable type may be provided in upper mandrel 10 between annular chambers 143 and 144 to prevent excessive buildup of vacuum or fluid pressure in annular chambers 143 and 144 during axial compensation stroking of upper mandrel 10 relative to tool housing 20. Due to the provision of axial compensation functionality as described above, relative axial translation of the box connection relative to the pin connection during make-up or break-out of a threaded tubular does not necessitate adjustments to the vertical position of the top drive relative to the connection being made up or broken out due to changes in the axial distance between the tubulars in the connection being made up or broken being broken out, thus preventing or limiting the development of unintended axial loads in the threads of the connection.

In the illustrated embodiment, an annular bearing 90 is disposed upon upward-facing shoulder 64 on piston housing 60 and encircling an upper region of lower mandrel 40, with a lock ring 185 disposed above bearing 90 around and anchored to lower mandrel 40 for axial retention of bearing 90 relative to tool housing 20 and lower mandrel 40. When compressive axial load is applied to THS 100, downward facing shoulder 15 of upper mandrel 10 abuts onto upper end 40U of lower mandrel 40, thus transferring axial loads through lock ring 185 to bearing 90 to piston housing 60 to endcap 30. When such compressive load is present, bearing 90 ensures that frictional resistance to rotation is sufficiently low during rotation of upper mandrel 10 and lower mandrel 40 relative to piston housing 60.

Friction within the various interfaces of THS 100—particularly at the abutment between upward-facing shoulder 14 on upper mandrel 10 and downward-facing shoulder 25 on tool housing bore 21, and between lock ring 185 and upward-facing shoulder 64—in the presence of axial loading of THS 100, causes torque to bypass the torque hold mechanism, and to be transmitted to endcap 30 via frictional forces generated at the interfaces. The torque allowed to bypass the torque-hold mechanism is a function of the axial load in THS 100 and the coefficient of friction between the abutting components. One particular intended use of THS 100 is for make-up of casing strings, during which minimal tensile axial load is present on THS 100, and as such THS 100 is been illustrated with shoulders 14 and 25 that have no supplementary means of friction reduction. However, in some applications, tensile axial load along with controlled torque-hold functionality may be desired simultaneously, and for such applications a low-friction bushing or bearing could be provided at this interface to minimize torque transfer through friction.

It will be apparent to persons skilled in the art that tools in accordance with this disclosure can readily adapted to provide any practical desired length of axial compensation stroke. However, the practical utility of torque transfer control tools in accordance with the present disclosure is not reliant upon the incorporation of axial compensation functionality. For application in which the required amount of axial compensation is minimal, the number and complexity of tool components can be reduced to provide a more compact tool, without taking away from the primary function of the tool, which is to provide control of torque during rotation.

Figure 10:
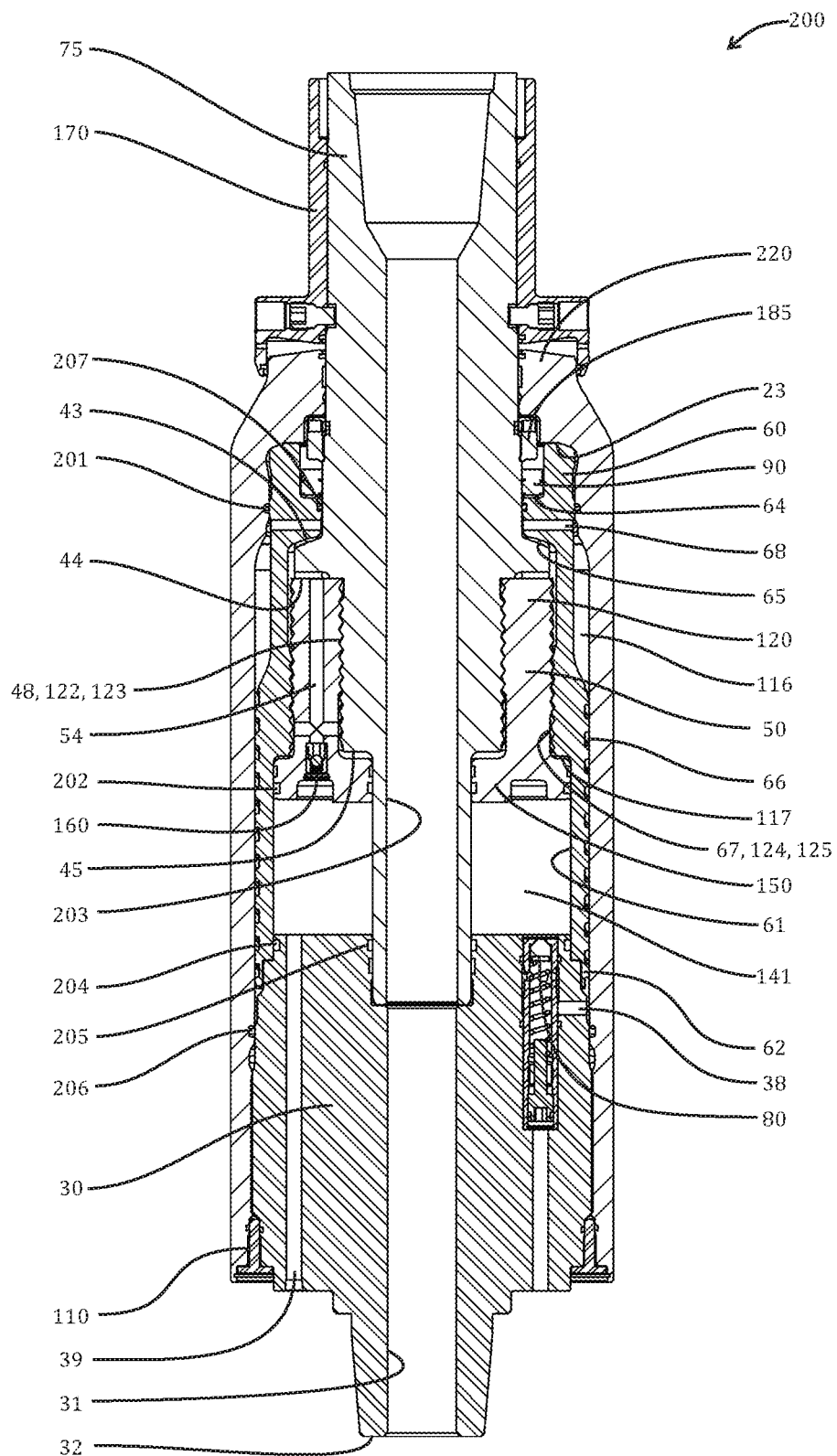
FIG. 10 is a longitudinal cross-section through a second embodiment of a tool in accordance with the present disclosure, generally corresponding to the embodiment of FIG. 1, but without axial compensation capability.

FIG. 10 illustrates a second exemplary embodiment 200 of a torque hold sub (THS) in accordance with the present disclosure. THS 200 is generally similar to THS 100 illustrated in FIGS. 1, 2, and 2A, except that it does not incorporate axial compensation capability. Accordingly, various components of THS 200 generally correspond to analogous components in THS 100 (and share the same reference numbers as for THS 100), with the notable exceptions that it has a unitary (i.e., one-piece) mandrel 75 rotatable within a tool housing 220 but is not axially movable relative to tool housing 220, and tool housing 220 is shorter than tool housing 20 in THS 100.

Figure 10A:
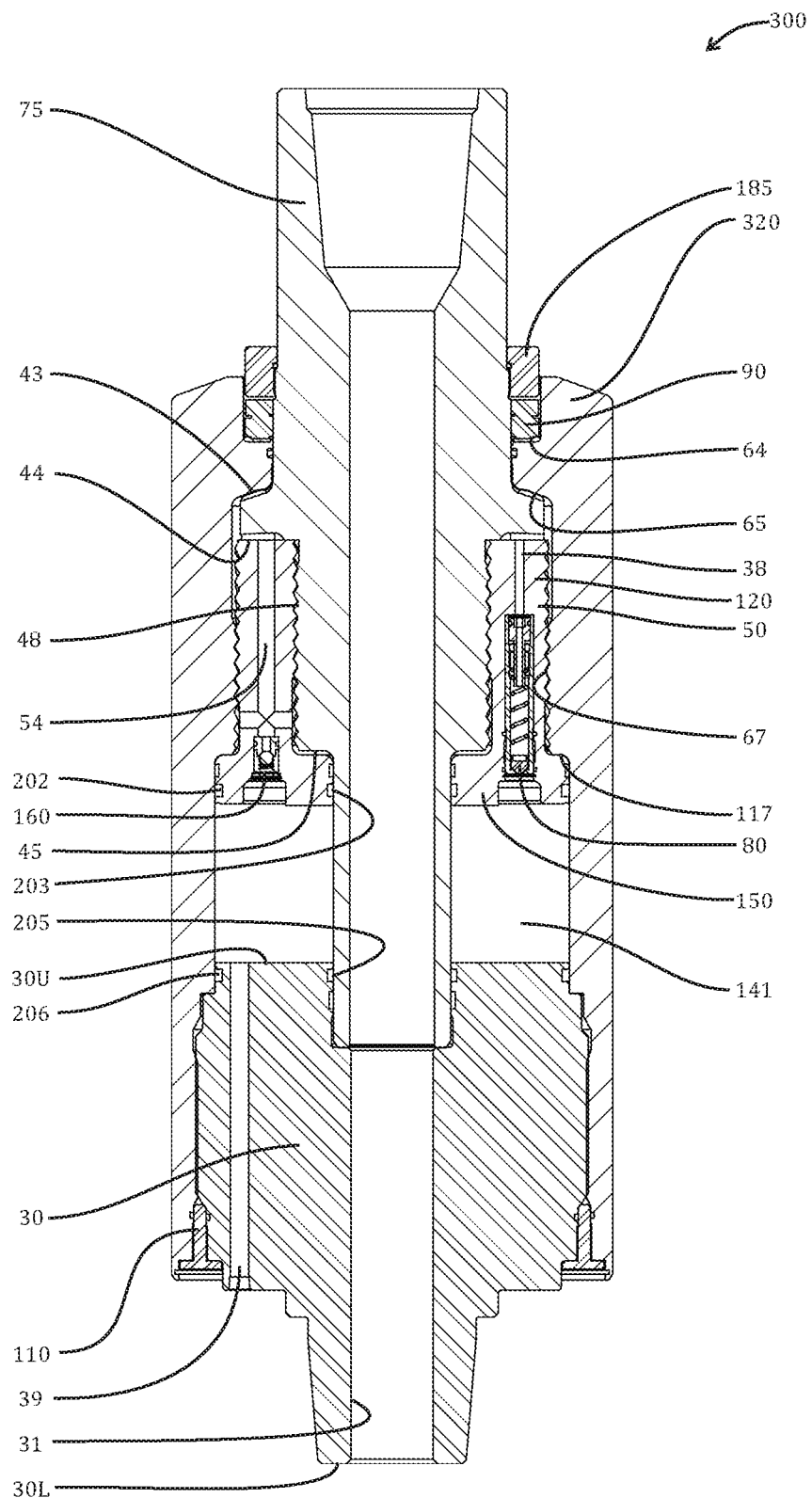
FIG. 10A is a longitudinal cross-section through a third embodiment of a tool in accordance with the present disclosure, generally similar to the embodiment of FIG. 10, but wherein the outer wall of the fluid chamber is defined by the inner bore of the tool housing, and not having a separate piston housing.

FIG. 10A illustrates a third exemplary embodiment 300 of a torque hold sub (THS) in accordance with the present disclosure. THS 300 is generally similar to THS 200 in FIG. 10, and various components of THS 300 generally correspond to analogous components in THS 200 (and share the same reference numbers as for THS 200). The main difference between THS 300 and THS 200 is that THS 300 does not incorporate a piston housing 60 as in THS 200 (and THS 100). Instead, the annular fluid chamber within which primary piston 150 axially strokes is formed in a modified tool housing 320.

Figure 11:
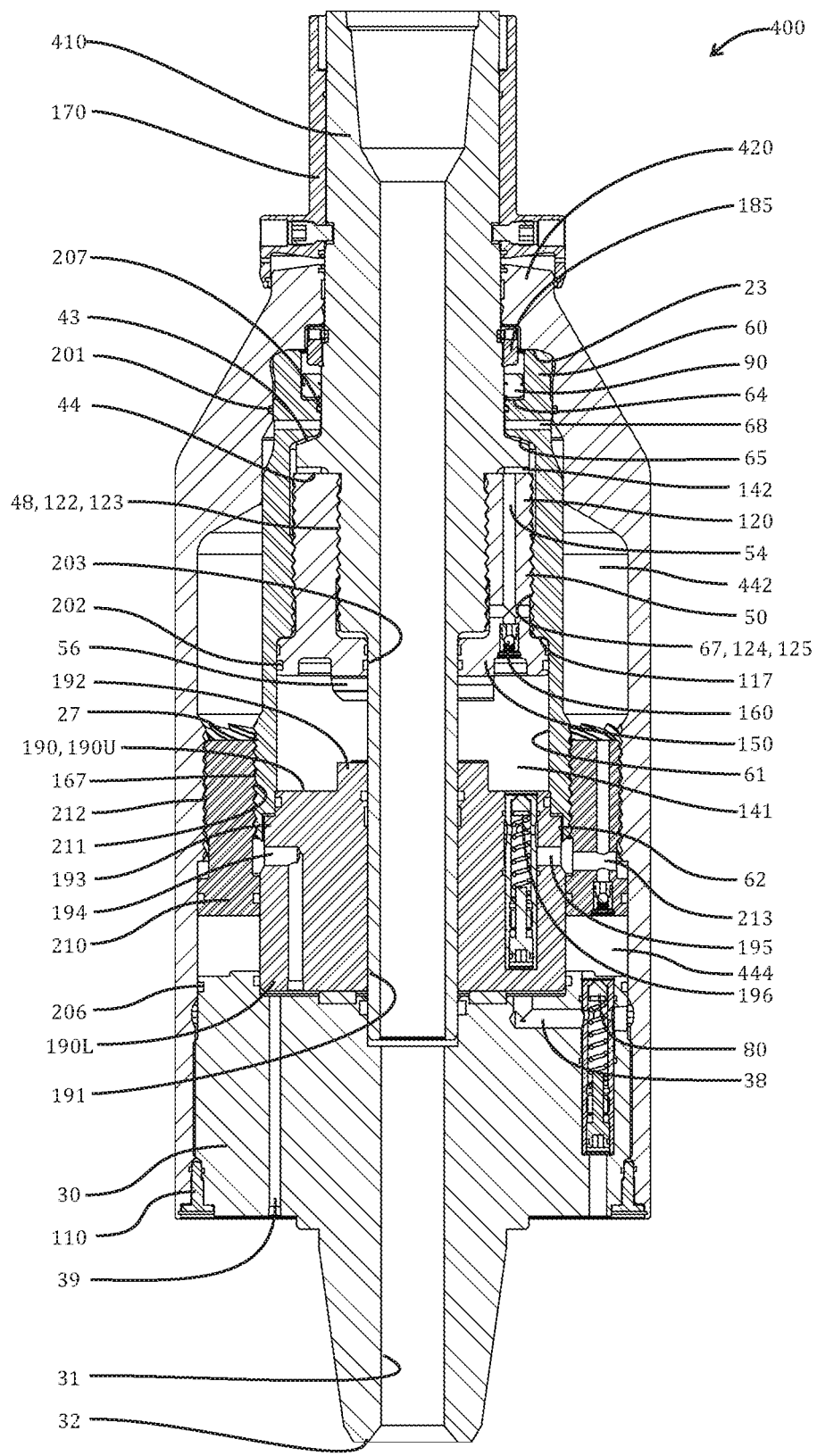
FIG. 11 is a longitudinal cross-section through a fourth embodiment of a tool in accordance with the present disclosure, having a secondary piston in addition to the primary piston, and not having axial compensation capability.

In some applications, it may be beneficial to incorporate multiple torque plateaus in the torque transmitted through the tool. FIG. 11 illustrates a fourth exemplary embodiment 400 of a torque hold sub tool (THS) that provides such a multiple-stage torque-hold mechanism. Although THS 400 as illustrated in FIG. 11 has only two torque-hold stages, it will be apparent to persons skilled in the art that any number of torque-hold stages could be provided as might be necessary or desirable for particular applications.

Various components of THS 400 generally correspond to analogous components in other illustrated embodiments, and share the same reference numbers. In addition to a modified unitary mandrel 410, a modified tool housing 420, THS 400 includes additional components as described below.

An endcap extension 190 is mounted on upper end 30U of endcap 30, and has an upper end 190U, a lower end 190L, and a coaxial longitudinal throughbore 191. A series of dog stops 192 are provided on upper end 190U near throughbore 191. The outer surface of endcap extension 190 is generally cylindrical, and has longitudinal keys 193 near its upper end for engagement with longitudinal keys 62 on piston housing 60. Endcap extension 190 further comprises port 194 and 195 providing for fluid communication in the assembled tool from its outer surface to its lower and upper ends, respectively.

THS 400 also includes a secondary piston 210 having configuration generally similar to that of actuator 50 and primary piston 150, but with necessarily larger inner and outer diameters, such that helical threads 211 and 212 located on its inner and outer surfaces, respectively, engage with helical threads 69 and 27 on the outer surface of piston housing 60 and the inner surface of tool housing 420, respectively.

Relative rotation between mandrel 410 and tool housing 420 causes primary piston 150 to rotate, thus resulting in concurrent axial movement downward away from mandrel 410 and toward endcap extension 190. The relative rotation and axial translation of primary piston 150 relative to mandrel 410 and tool housing 420 depends on the helix angles of helical engagements between piston shaft 120 and piston housing 60 and between piston shaft 120 and mandrel 410, respectively. Downward axial translation of primary piston 150 results in compressive loads being transmitted to a fluid placed in annular chamber 141, thus increasing the pressure of that fluid, and thereby restraining incremental axial translation of primary piston 150.

While axial translation of primary piston 150 is restrained by the fluid, relative rotation between mandrel 410, primary piston 150 and piston housing 60 is prevented, such that the torsional loads are transmitted through these torque-hold mechanism components to secondary piston 210, causing secondary piston 210 to rotate, resulting in concurrent downward axial movement away from piston housing 60 and toward endcap 30. Downward axial translation of secondary piston 210 results in compressive loads being transmitted to a fluid placed in an annular fluid chamber 444 below secondary piston 210, thus increasing the pressure of that fluid, and thereby restraining incremental axial translation of secondary piston 210. As torsional loads increase, the pressures of the fluids in fluid chambers 141 and 444 will increase due to the increased axial compression placed on the fluid by primary piston 150 and secondary piston 210, respectively.

When the pressure in chamber 141 exceeds the opening pressure of valve 196 located in endcap extension 190, fluid will be displaced from chamber 141 through relief 196, port 195, port 213, annular chamber 442, and port 68 to fluid chamber 142 thus allowing axial translation of primary piston 150 towards endcap extension 190, while valve 196 ensures the fluid pressure is maintained at the opening pressure, thus torsional load transmitted through the torque-hold mechanism plateaus while relative rotation occurs between mandrel 410 and endcap 30. When primary piston 150 has helically translated a sufficient distance, dog stops 56 make contact with dog stops 192 on endcap extension 190, thus preventing further rotation so that incremental rotation applied to mandrel 410 is passed directly to piston housing 60.

When the pressure in chamber 445 exceeds the opening pressure of valve 80 located in encap 30, fluid will be displaced upward from chamber 444 via valve 80, port 38, port 194, and port 213 to an annular chamber 442 above secondary piston 210, thus allowing axial translation of secondary piston 210 toward endcap 30, while valve 80 ensures the fluid pressure is maintained at the opening pressure, thus torsional load transmitted through the torque-hold mechanism plateaus while relative rotation occurs between mandrel 410 and endcap 30. When secondary piston 210 has helically translated a sufficient distance, dog stops 214 make contact with dog stops 310 on endcap 30, thus preventing further rotation so that incremental rotation applied to mandrel 410 is passed directly to endcap 30.

The opening pressure of valves 80 and 196 therefore control the maximum torsional load that can be transferred through the torque-hold mechanism before activation of each respective torque hold stage. Generally, the opening pressure of valve 80 is set to open at a lower pressure than valve 196, thus activating torque hold via primary piston 150 first. However, given the teachings above, it will be apparent to those skilled in the art that the sequence of torque hold stage activation does not impact the intended function of the tool. Further, in some applications it may be advantageous to set the opening pressures of valves 80 and 220 such that both torque hold stages activate at a similar torque, thus increasing the number of relative rotations during the torque plateau.

The torque-hold mechanism is reset by applying breakout rotation in a manner that is similar to that of the preferred embodiment, but where breakout rotation drives concurrent rotation and upward axial translation of both primary piston 150 and secondary piston 210.

Tensile loading applied to THS 400 is transferred from mandrel 410 to piston housing 60 to tool housing 420 to pin connection 32 on the lower end of endcap 30. Compressive load applied to the tool is transferred from mandrel 410 to lock ring 185 to bearing 90 to piston housing 60 to endcap extension 190 to endcap 30.

Figure 12:
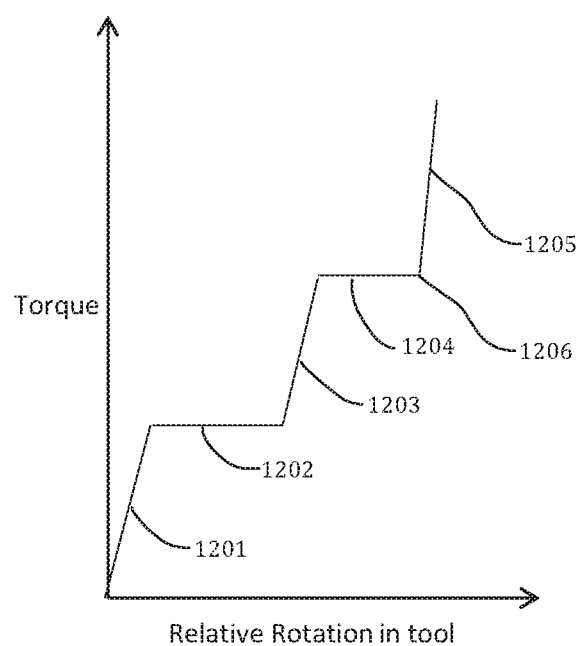
FIG. 12 is a graph of applied torque versus relative rotation between the mandrel and the tool housing, with reference to the embodiment illustrated in FIG. 11.

Referring now to FIG. 12, showing the relationship of the torque transmitted through a two-stage tool as a function of the relative rotation within the tool, curve portion 1201 shows the initial tool response, which is a function of the tool stiffness and the compliance of the restraining fluids in the tool. Curve portion 1202 shows the response when the first stage of torque hold is activated at a pre-set torque level. Curve portion 1203 shows the tool response when the first-stage torque-hold mechanism bottoms out and the response again becomes a function of the tool stiffness and compliance of the restraining fluids in the tool. Curve portion 1204 shows the response after the second stage of torque hold is activated at a pre-set torque level. Curve portion 1205 shows the tool response as the second stage bottoms out and the torque transmitted becomes a function of tool component stiffness only. Thus curve portion 1205 will be necessarily steeper than curve portions 1201 and 1203.

As with the preferred embodiment, the torque response will vary somewhat under increasing rotational speeds based on fluid and flow path characteristics that can be selected to obtain a particular torque hold behaviour.

It will be readily appreciated by those skilled in the art that various modifications to embodiments in accordance with the present disclosure may be devised without departing from the scope of the present teachings, including modifications which may use equivalent structures or materials hereafter conceived or developed. It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure.

Relational and conformational terms such as (but not limited to) "coaxial" and "axisymmetric" are not intended to denote or require absolute mathematical or geometrical precision. Accordingly, such terms are to be understood as denoting or requiring substantial precision only (e.g., "substantially coaxial" or "substantially axisymmetric") unless the context clearly requires otherwise.

Unless specifically noted otherwise, any reference to an element being "generally cylindrical" is intended to denote that the element in question would appear substantially cylindrical in transverse cross-section, although the cross-sectional configuration of the element may vary along its length.

Wherever used in this document, the terms "typical" and "typically" are to be understood and interpreted in the sense of being representative of common usage or practice, and are not to be understood or interpreted as implying essentiality or invariability.

The embodiments in which an exclusive property or privilege is claimed are defined as follows:

1. A tool for controlling torque transfer in a torsional drive system, said tool comprising:
   (a) an elongate mandrel having an upper end, a lower end, and a generally cylindrical outer surface, wherein said upper end of the mandrel is adapted for coaxial and co-rotatable connection to a first torsional drive system component;
   (b) a generally cylindrical tool housing having an upper end and a lower end, and defining a tool housing bore extending from said upper end at least partially through the housing, wherein:
      the lower end of the mandrel extends coaxially into the housing bore such that the mandrel is rotatable relative to the tool housing;
      the lower end of the tool housing is adapted for coaxial and co-rotatable connection to a second torsional drive system component;
      the tool defines a primary fluid chamber in a region of the tool housing bore not occupied by the mandrel; and
      the mandrel is coupled to the tool housing such that axial loads can be transferred from the mandrel to the tool housing;
   (c) a primary piston having a cylindrical outer surface, said primary piston being sealingly movable axially within the primary fluid chamber such that the primary piston divides the primary fluid chamber into an upper primary fluid chamber above the primary piston and a lower primary fluid chamber below the primary piston, with the respective volumes of the upper and lower primary fluid chambers varying with the axial position of the primary piston, and with at least one of the upper and lower primary fluid chambers being configured to provide pressurized fluid containment;
   (d) fluid communication means, for enabling fluid communication out of at least one of the upper and lower primary fluid chambers at a selected pressure; and (e) piston actuation means whereby rotation of the mandrel in a first direction will cause downward movement of the primary piston within the primary fluid chamber, and whereby rotation of the mandrel in a second direction will cause upward movement of the primary piston within the primary fluid chamber;

wherein:

(f) downward movement of the primary piston will tend to pressurize and expel fluid present in the lower primary fluid chamber;

(g) upward movement of the primary piston will tend to pressurize and expel fluid present in the upper primary fluid chamber; and (h) the mandrel is a mandrel assembly comprising an upper mandrel and a lower mandrel, wherein the lower mandrel coaxially engages the upper mandrel so as to be co-rotatable therewith, and such that the upper mandrel is axially movable relative to the lower mandrel and the tool housing.

2. A tool as in claim 1 wherein the mandrel has a longitudinal throughbore.

3. A tool as in claim 1 wherein an endcap is sealingly mounted in a lower region of the tool housing.

4. A tool as in claim 3 wherein the endcap has a longitudinal throughbore in fluid communication with the throughbore of the mandrel.

5. A tool for controlling torque transfer in a torsional drive system, said tool comprising:

(a) an elongate mandrel having an upper end, a lower end, and a generally cylindrical outer surface, wherein said upper end of the mandrel is adapted for coaxial and co-rotatable connection to a first torsional drive system component;

(b) a generally cylindrical tool housing having an upper end and a lower end, and defining a tool housing bore extending from said upper end at least partially through the housing, wherein:

the lower end of the mandrel extends coaxially into the housing bore such that the mandrel is rotatable relative to the tool housing;

the lower end of the tool housing is adapted for coaxial and co-rotatable connection to a second torsional drive system component;

the tool defines a primary fluid chamber in a region of the tool housing bore not occupied by the mandrel; and the mandrel is coupled to the tool housing such that axial loads can be transferred from the mandrel to the tool housing;

(c) a primary piston having a cylindrical outer surface, said primary piston being sealingly movable axially within the primary fluid chamber such that the primary piston divides the primary fluid chamber into an upper primary fluid chamber above the primary piston and a lower primary fluid chamber below the primary piston, with the respective volumes of the upper and lower primary fluid chambers varying with the axial position of the primary piston, and with at least one of the upper and lower primary fluid chambers being configured to provide pressurized fluid containment;

(d) fluid communication means, for enabling fluid communication out of at least one of the upper and lower primary fluid chambers at a selected pressure; and (e) piston actuation means whereby rotation of the mandrel in a first direction will cause downward movement of the primary piston within the primary fluid chamber, and whereby rotation of the mandrel in a second direction will cause upward movement of the primary piston within the primary fluid chamber;

wherein:

(f) downward movement of the primary piston will tend to pressurize and expel fluid present in the lower primary fluid chamber;

(g) upward movement of the primary piston will tend to pressurize and expel fluid present in the upper primary fluid chamber;

(h) the piston actuation means comprises a cylindrical piston shaft extending upward from the primary piston, said piston shaft having a cylindrical piston shaft wall with an inner cylindrical surface and an outer cylindrical surface;

(i) the inner cylindrical surface of the piston shaft wall has helical threading matingly engageable with helical threading on the outer surface of the mandrel, such that rotation of the mandrel will cause the primary piston to rotate and to translate axially relative to the tool housing; and (j) the cylindrical outer surface of the piston shaft wall has helical threading matingly engageable with helical threading on the bore of a cylindrical piston housing coaxially disposed within the tool housing bore.

6. A tool as in claim 5 wherein the cylindrical outer surface of the piston is longitudinally slidingly engageable with the piston housing bore.

7. A tool as in claim 5 wherein the fluid communication means comprises a valve disposed in an axial direction through the primary piston and the piston shaft wall.

8. A tool for controlling torque transfer in a torsional drive system, said tool comprising:

(a) an elongate mandrel having an upper end, a lower end, and a generally cylindrical outer surface, wherein said upper end of the mandrel is adapted for coaxial and co-rotatable connection to a first torsional drive system component;

(b) a generally cylindrical tool housing having an upper end and a lower end, and defining a tool housing bore extending from said upper end at least partially through the housing, wherein:

the lower end of the mandrel extends coaxially into the housing bore such that the mandrel is rotatable relative to the tool housing;

the lower end of the tool housing is adapted for coaxial and co-rotatable connection to a second torsional drive system component;

the tool defines a primary fluid chamber in a region of the tool housing bore not occupied by the mandrel; and the mandrel is coupled to the tool housing such that axial loads can be transferred from the mandrel to the tool housing;

(c) a primary piston having a cylindrical outer surface, said primary piston being sealingly movable axially within the primary fluid chamber such that the primary piston divides the primary fluid chamber into an upper primary fluid chamber above the primary piston and a lower primary fluid chamber below the primary piston, with the respective volumes of the upper and lower primary fluid chambers varying with the axial position of the primary piston, and with at least one of the upper and lower primary fluid chambers being configured to provide pressurized fluid containment;

(d) fluid communication means, for enabling fluid communication out of at least one of the upper and lower primary fluid chambers at a selected pressure; and (e) piston actuation means whereby rotation of the mandrel in a first direction will cause downward movement of the primary piston within the primary fluid chamber, and whereby rotation of the mandrel in a second direction will cause upward movement of the primary piston within the primary fluid chamber;

wherein:

(f) downward movement of the primary piston will tend to pressurize and expel fluid present in the lower primary fluid chamber;

(g) upward movement of the primary piston will tend to pressurize and expel fluid present in the upper primary fluid chamber;

(h) the piston actuation means comprises a cylindrical piston shaft extending upward from the primary piston, said piston shaft having a cylindrical piston shaft wall with an inner cylindrical surface and an outer cylindrical surface;

(i) the inner cylindrical surface of the piston shaft wall has helical threading matingly engageable with helical threading on the outer surface of the mandrel, such that rotation of the mandrel will cause the primary piston to rotate and to translate axially relative to the tool housing; and (j) the cylindrical outer surface of the piston shaft wall has longitudinal splines matingly engageable with splines on the bore of a cylindrical piston housing coaxially disposed within the tool housing bore.

9. A tool as in claim 8 wherein the fluid communication means comprises a valve disposed in an axial direction through the primary piston and the piston shaft wall.

10. A tool for controlling torque transfer in a torsional drive system, said tool comprising:

(a) an elongate mandrel having an upper end, a lower end, and a generally cylindrical outer surface, wherein said upper end of the mandrel is adapted for coaxial and co-rotatable connection to a first torsional drive system component;

(b) a generally cylindrical tool housing having an upper end and a lower end, and defining a tool housing bore extending from said upper end at least partially through the housing, wherein:

the lower end of the mandrel extends coaxially into the housing bore such that the mandrel is rotatable relative to the tool housing;

the lower end of the tool housing is adapted for coaxial and co-rotatable connection to a second torsional drive system component;

the tool defines a primary fluid chamber in a region of the tool housing bore not occupied by the mandrel; and the mandrel is coupled to the tool housing such that axial loads can be transferred from the mandrel to the tool housing;

(c) a primary piston having a cylindrical outer surface, said primary piston being sealingly movable axially within the primary fluid chamber such that the primary piston divides the primary fluid chamber into an upper primary fluid chamber above the primary piston and a lower primary fluid chamber below the primary piston, with the respective volumes of the upper and lower primary fluid chambers varying with the axial position of the primary piston, and with at least one of the upper and lower primary fluid chambers being configured to provide pressurized fluid containment;

(d) fluid communication means comprising:

a first primary valve to enable fluid communication out of the lower primary fluid chamber at a selected first primary opening pressure; and a second primary valve to enable fluid communication out of the upper primary fluid chamber at a selected second primary opening pressure, which may be different from the selected first primary opening pressure; and (e) piston actuation means whereby rotation of the mandrel in a first direction will cause downward movement of the primary piston within the primary fluid chamber, and whereby rotation of the mandrel in a second direction will cause upward movement of the primary piston within the primary fluid chamber;

wherein:

(f) downward movement of the primary piston will tend to pressurize and expel fluid present in the lower primary fluid chamber;

(g) upward movement of the primary piston will tend to pressurize and expel fluid present in the upper primary fluid chamber;

(h) the selected first primary opening pressure of the first primary valve limits the magnitude of torque transferred by the tool in the first direction within the stroking range of the primary piston; and (i) the selected second primary opening pressure of the second primary valve limits the magnitude of torque transferred by the tool in the second direction within the stroking range of the primary piston.

11. A tool as in claim 10 wherein the mandrel comprises a unitary mandrel, and wherein the mandrel is not axially movable relative to the tool housing.

12. A tool as in claim 10 wherein the mandrel is a mandrel assembly comprising an upper mandrel and a lower mandrel, wherein the lower mandrel coaxially engages the upper mandrel so as to be co-rotatable therewith, and such that the upper mandrel is axially movable relative to the lower mandrel and the tool housing within a predetermined axial stroke range.

13. A tool as in claim 10 wherein:

(a) the piston actuation means comprises a cylindrical piston shaft extending upward from the primary piston, said piston shaft having a cylindrical piston shaft wall with an inner cylindrical surface and an outer cylindrical surface; and (b) the inner cylindrical surface of the piston shaft wall has helical threading matingly engageable with helical threading on the outer surface of the mandrel;

such that rotation of the mandrel will cause the primary piston to rotate and to translate axially relative to the tool housing.

14. A tool as in claim 13 wherein the cylindrical outer surface of the piston shaft wall has helical threading matingly engageable with helical threading on the bore of a cylindrical piston housing coaxially disposed within the tool housing bore.

15. A tool as in claim 14 wherein the cylindrical outer surface of the piston is longitudinally slidingly engageable with the piston housing bore.

16. A tool as in claim 14 wherein the cylindrical outer surface of the piston shaft wall has longitudinal splines matingly engageable with splines on the bore of a cylindrical piston housing coaxially disposed within the tool housing bore.

17. A tool as in claim 13 wherein the cylindrical outer surface of the piston shaft wall has helical threading matingly engageable with helical threading on the tool housing bore.

18. A tool as in claim 17 wherein the cylindrical outer surface of the piston is longitudinally slidingly engageable with the tool housing bore.

19. A tool as in claim 13 wherein the cylindrical outer surface of the piston shaft wall has longitudinal splines matingly engageable with splines on the tool housing bore.

20. A tool as in claim 13 wherein the fluid communication means comprises a valve disposed in an axial direction through the primary piston and the piston shaft wall.

21. A tool as in claim 14 wherein the mandrel has a longitudinal throughbore.

22. A tool as in claim 14 wherein an endcap is sealingly mounted in a lower region of the tool housing.

23. A tool as in claim 22 wherein the endcap has a longitudinal throughbore in fluid communication with the throughbore of the mandrel.

24. A tool as in claim 10, further comprising a secondary piston axially movable within a secondary fluid chamber, wherein:
(a) the secondary piston divides the secondary fluid chamber into an upper secondary fluid chamber above the secondary piston and a lower secondary fluid chamber below the secondary piston, with the respective volumes of the upper and lower secondary fluid chambers varying with the axial position of the secondary piston, and with at least one of the upper and lower secondary fluid chambers being configured to provide pressurized fluid containment;
(b) the fluid communication means further comprises:
   a first secondary valve to enable fluid communication out of the lower secondary fluid chamber at a selected first secondary opening pressure; and
   a second secondary valve to enable fluid communication out of the upper secondary fluid chamber at a selected second secondary opening pressure, which may be different from the selected first secondary opening pressure; and
(c) the secondary piston is rotatably engageable with the mandrel such that:
   rotation of the mandrel in a first direction will cause downward movement of the secondary piston within the secondary fluid chamber;
   rotation of the mandrel in a second direction will cause upward movement of the secondary piston within the secondary fluid chamber;
   downward movement of the secondary piston will tend to pressurize and expel fluid present in the lower secondary fluid chamber;
   upward movement of the secondary piston will tend to pressurize and expel fluid present in the upper secondary fluid chamber;
   the selected first secondary opening pressure of the first secondary valve limits the magnitude of torque transferred by the tool in the first direction within the stroking range of the secondary piston; and
the selected second secondary opening pressure of the second secondary valve limits the magnitude of torque transferred by the tool in the second direction within the stroking range of the secondary piston.

* * * * *